US012438584B2

(12) United States Patent
Zhang et al.

(10) Patent No.: US 12,438,584 B2
(45) Date of Patent: Oct. 7, 2025

(54) CSI COMPRESSION AND FEEDBACK METHOD BASED ON DEEP LEARNING

(71) Applicant: ZHEJIANG UNIVERSITY, Zhejiang (CN)

(72) Inventors: Zhaoyang Zhang, Hangzhou (CN); Zirui Chen, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 0 days.

(21) Appl. No.: 18/969,330

(22) Filed: Dec. 5, 2024

(65) Prior Publication Data
US 2025/0096872 A1    Mar. 20, 2025

Related U.S. Application Data

(63) Continuation of application No. PCT/CN2023/093244, filed on May 10, 2023.

(30) Foreign Application Priority Data

Sep. 1, 2022   (CN) .......................... 202211065211.4

(51) Int. Cl.
H04B 7/06       (2006.01)
H04L 5/00       (2006.01)
H04L 41/16      (2022.01)

(52) U.S. Cl.
CPC ......... *H04B 7/0626* (2013.01); *H04L 5/0007* (2013.01); *H04L 41/16* (2013.01)

(58) Field of Classification Search
CPC ...... H04B 7/0626; H04L 5/0007; H04L 41/16
See application file for complete search history.

(56) References Cited

U.S. PATENT DOCUMENTS

2020/0220593 A1    7/2020  Wen et al.
2021/0273707 A1    9/2021  Yoo et al.
(Continued)

FOREIGN PATENT DOCUMENTS

CN    104412684 A    3/2015
CN    108390706 A    8/2018
(Continued)

OTHER PUBLICATIONS

Bahar et al. (Towards Two-Dimensional Sequence to Sequence Model in Neural Machine Translation, arXiv:1810.03975v1, published 2018, pp. 1-7). (Year: 2018).*
(Continued)

*Primary Examiner* — Tan H Tran
(74) *Attorney, Agent, or Firm* — Wiersch Law Group

(57) ABSTRACT

A channel state information CSI compression and feedback solution based on deep learning. In a large-scale multiple-input-multiple-output MIMO system, CSI is very important for the base station to achieve high performance gain. In a frequency division duplex FDD mode, user equipment UE needs to estimate CSI and then feed it back to the base station. Effective CSI compression will greatly reduce the cost of feedback. The present disclosure uses a two-dimensional sequence-to-sequence 2D Seq2Seq structure neural network to realize effective CSI compression and reconstruction. The base station uses CSI data to train the parameters of the neural network, which, after training, are deployed at the client and the base station for effective CSI compression and reconstruction. The present disclosure can realize high-precision compression and reconstruction of CSI, and provides an efficient and stable channel state information feedback method for a MIMO system.

7 Claims, 4 Drawing Sheets

(56) References Cited

U.S. PATENT DOCUMENTS

2023/0412230 A1* 12/2023 Saber ............... G06N 20/10
2025/0015859 A1* 1/2025 Kyung ............... H04B 7/0663

FOREIGN PATENT DOCUMENTS

| CN | 109672464 A | 4/2019 |
| CN | 111339789 A | 6/2020 |
| CN | 112532558 A | 3/2021 |
| CN | 114051234 A | 2/2022 |
| CN | 114614920 A | 6/2022 |
| CN | 115549742 A | 12/2022 |

OTHER PUBLICATIONS

Wen et al. (Deep Learning for Massive MIMO CSI Feedback, IEEE, published 2018, pp. 1-4). (Year: 2018).*
International Search Report (PCT/CN2023/093244); Date of Mailing: Aug. 9, 2023 (7 pages).
Chinese Notice Of Allowance(202211065211.4); Date of Mailing: Apr. 30, 2024 (6 pages).
Viewing Channel as Sequence Rather than Image: A 2-D Seq2Seq Approach for Efficient MIMO-OFDM CSI Feedback.
Viewing the MIMO Channel as Sequence Rather than Image A Seq2Seq Approach for Efficient CSI Feedback.
An Improved CSI Feedback Delay Algorithm Based on Convolutional Neural Network for Massive MIMO Systems.

* cited by examiner

CSI COMPRESSION AND FEEDBACK METHOD BASED ON DEEP LEARNING

CROSS-REFERENCE TO RELATED APPLICATIONS

The present application is a continuation of International Application No. PCT/CN2023/093244, filed on May 10, 2023, which claims priority to Chinese Application No. 202211065211.4, filed on Sep. 1, 2022, the contents of both of which are incorporated herein by reference in their entireties.

TECHNICAL FIELD

The present disclosure relates to the field of wireless communication, and in particular, to a CSI compression and feedback method based on deep learning.

BACKGROUND

MIMO (Multiple Input Multiple Output) antenna array and OFDM (Orthogonal Frequency Division Multiplexing) are two key technologies in 5G (Fifth Generation) and B5G (Beyond 5G) communication systems. In a MIMO-OFDM system, in order to bring sufficient performance gain, a base station needs accurate downlink CSI (Channel State Information) for beamforming, subcarrier allocation and power control. In a FDD (Frequency Division Duplex) mode, the downlink CSI needs to be estimated at a user equipment side, and fed back to the base station by the user equipment side. However, in the MIMO-OFDM system, the numbers of antennas and subcarriers are usually high, so that the data dimension of CSI is very high, which leads to high CSI feedback cost.

MIMO-OFDM CSI is usually expressed as one matrix in mathematics, in which row and column indexes correspond to antenna and subcarrier index information, respectively. Due to the similarity of electromagnetic wave transmission between different antennas and subcarriers, there is implicit correlation between elements in a CSI matrix, which makes the whole CSI matrix compressible. Therefore, how to effectively compress CSI to reduce the feedback cost has become an important topic in the field of wireless communication.

In recent years, deep learning technology has been widely used in the field of wireless communication, showing great application potential. However, most of the current deep learning methods are data-driven, which usually cannot fully tap the potential of deep learning technology in the current task.

At present, most CSI compression and feedback methods based on deep learning use a convolutional neural network CNN to compress and reconstruct CSI. However, due to the translation invariance and smoothness of convolutional neural networks, CSI compression reconstruction methods based on CNN usually encounter significant performance bottlenecks. Based on the physical characteristics of MIMO-OFDM CSI, how to design a neural network structure that is more suitable for the unique characteristics of MIMO-OFDM CSI to give full play to the potential of deep learning in CSI compression and reconstruction has become an important issue in the compression and feedback task of MIMO-OFDM CSI.

SUMMARY

The present disclosure aims to provide a more efficient CSI compression and reconstruction method based on the shortcomings of the prior art, so as to better complete the CSI feedback task.

The specific technical solution adopted by the present disclosure is as follows: a CSI compression and feedback method based on deep learning includes the following steps:

S1, establishing and training a two-dimensional sequence-to-sequence structure neural network;

S1.1, collecting, by a base station, CSI data from historical communication data as training data of the two-dimensional sequence-to-sequence structure neural network;

S1.2, building, by the base station, the two-dimensional sequence-to-sequence structure neural network, and randomly initializing parameters of the two-dimensional sequence-to-sequence structure neural network, wherein the two-dimensional sequence-to-sequence structure neural network includes an encoder and a decoder, the encoder includes first cells and first sub-blocks, the decoder includes second cells and second sub-blocks, the encoder includes one two-dimensional recurrent neural network and one fully connected network in a cascade connection, the decoder includes one fully connected network and one two-dimensional recurrent neural network in a cascade connection; inputting, by the encoder, the first sub-blocks divided from CSI into the first cells, concatenating outputs of the first cells into a first matrix according to an order of the first cells, and compressing the first matrix into a first vector; and reshaping, by the decoder, the compressed first vector into a second matrix, dividing the second matrix into the second sub-blocks, input the second sub-blocks into the second cells, and concatenating outputs of the second cells according to an order of the second cells to obtain reconstructed CSI; and S1.3, training, by the base station, the two-dimensional sequence-to-sequence structure neural network in the sub-step S1.2 by using the collected CSI data, and continuously training the parameters of the two-dimensional sequence-to-sequence structure neural network through a gradient descent method until convergence;

S2, distributing, by the base station, the encoder of the two-dimensional sequence-to-sequence structure neural network trained in the sub-step S1.3 to a client;

S3, compressing, by the client, downlink CSI by using the encoder distributed in the step S2, and feeding the compressed CSI back to the base station; and S4, reconstructing, by the base station, the compressed CSI fed back by the client in the step S3 by using the decoder of the two-dimensional sequence-to-sequence structure neural network trained in the sub-step S1.3 to obtain complete downlink CSI.

Further, the two-dimensional recurrent neural network uses a two-dimensional long short-term memory network.

Further, a CSI division process in S1.2 is as follows: dividing the CSI into two-dimensional sequences including several sub-blocks for $N_t \times N_c$-dimensional multi input MIMO-OFDM CSI, where $N_t$ represents a number of base station antennas and $N_c$ represents a number of subcarriers.

Further, a working process of the encoder is as follows: inputting each sub-block obtained after dividing the MIMO-OFDM CSI into a first cell corresponding to the two-dimensional long short-term memory network of the encoder, wherein an output size of the first cell in the two-dimensional long short-term memory network is same as a dimension of the sub-blocks; concatenating the outputs of all the first cells into a first matrix with a dimension size of $N_t \times N_c$ according to the order of the first cells, and stretching the first matrix into a first vector with a length of $N_t \times N_c$; and inputting the first vector with the length of $N_t \times N_c$ into a fully connected layer to obtain a compressed vector $h_{com}$.

Further, a working process of the decoder is as follows: inputting the compressed vector $h_{com}$ compressed by the encoder into a fully connected layer in the decoder to obtain a second vector with a length of $N_t \times N_c$, reconstructing the second vector with the length of $N_t \times N_c$ into a second matrix with a dimension size of $N_t \times N_c$, dividing the second matrix into the second sub-blocks in a same way as the CSI division process, sequentially inputting the second sub-blocks into the second cells corresponding to the two-dimensional long short-term memory network of the decoder, and concatenating the outputs of all the second cells into the second matrix with the dimension size of $N_t \times N_c$ according to the order of the second cells to obtain reconstructed MIMO-OFDM CSI.

Further, in a training method for the neural network in S1.3, a loss function Loss(Θ) of the neural network is defined as follows:

$$\text{Loss}(\Theta) = \frac{1}{N} \sum_{n=1}^{N} \|H_n - \tilde{H}_n\|_2^2,$$

where Θ represents a parameter set of the two-dimensional sequence-to-sequence structure neural network, N represents a number of the training data, $H_n$ represents a $n^{th}$ original training data, and $\tilde{H}_n$ represents an output obtained by inputting $H_n$ into the two-dimensional sequence to sequence structure neural network.

Further, the two-dimensional sequence-to-sequence structure neural network in the sub-step S1.3 is trained based on a optimizer based on gradient descent, including: performing, by the optimizer, gradient descent by deriving the loss function and backpropagating the gradient to generate a gradient corresponding to the parameters of the two-dimensional sequence-to-sequence structure neural network, to continuously optimize the parameters of the two-dimensional sequence-to-sequence structure neural network until the convergence.

The present disclosure has the beneficial effects that the CSI compression and feedback method based on 2D Seq2Seq can realize high-precision CSI feedback under the condition of using feedback vectors with fewer dimensions, and solve the performance bottleneck problem of other current CSI feedback methods based on deep learning. Moreover, the relationship between the computational complexity of this solution has a linear correlation with the number of antennas $N_t$ and the number of subcarriers $N_c$, and the computational complexity is low, which is suitable for the actual deployment requirements.

DESCRIPTION OF EMBODIMENTS

In this embodiment, the base station of the large-scale access system is equipped with 32 antennas, and each user terminal is equipped with one antenna. The base station uses an OFDM mode with 256 subcarriers to serve the users.

Based on the base station, this embodiment provides a CSI feedback solution based on deep learning, which includes the following steps:

1) A base station collects 40,000 CSI data from historical communication data as training data of the neural network.

Figure 1:
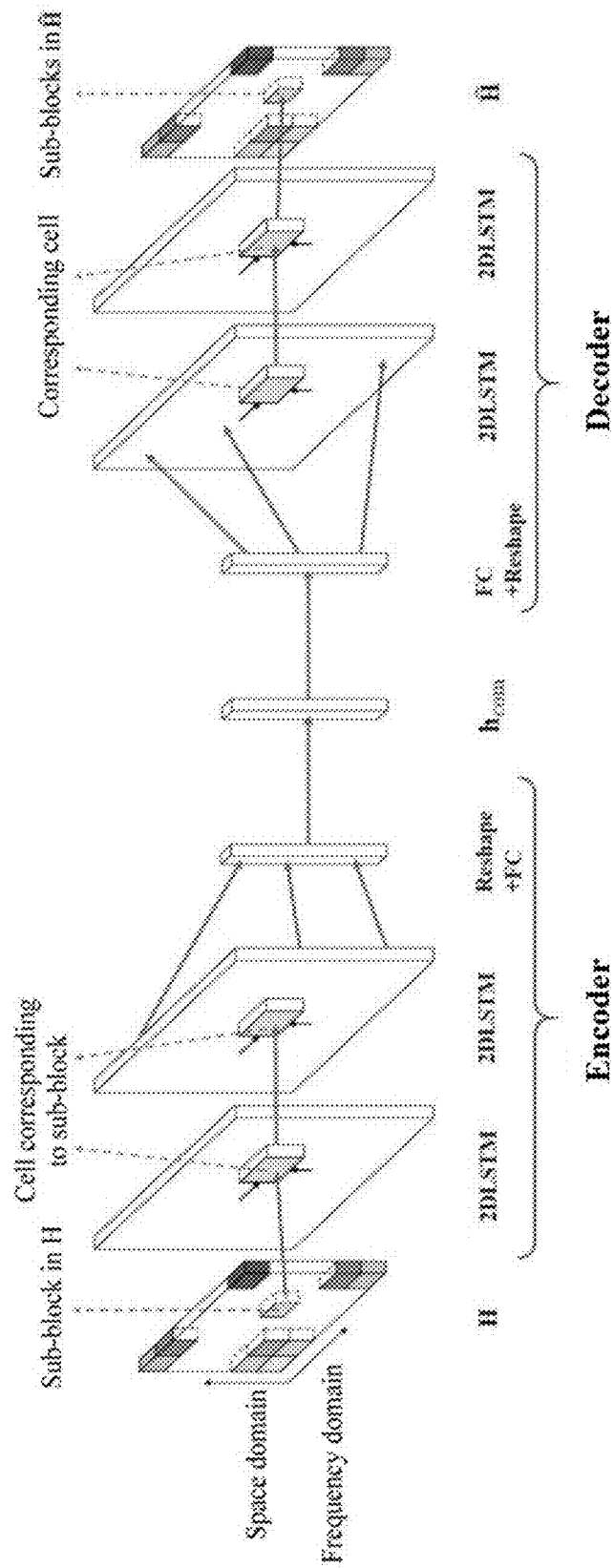
FIG. 1 is a schematic diagram of the overall framework of 2D Seq2Seq deep learning.

2) The base station builds a 2D Seq2Seq (two-dimensional sequence-to-sequence) structure neural network according to the structure shown in FIG. 1, randomly initializes the parameters of the neural network, and sets the size of a hidden layer of 2D LSTM in 2D Seq2Seq to 128.

Figure 2:
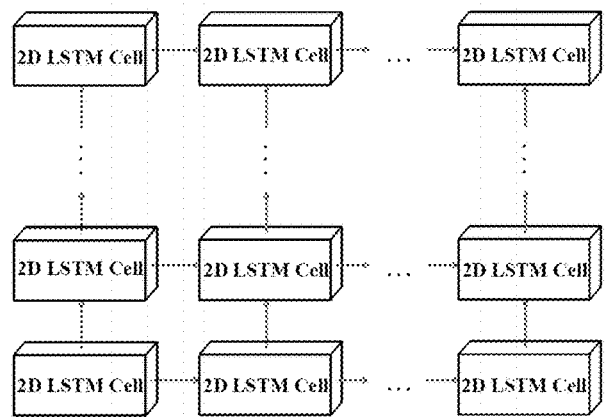
FIG. 2 is a schematic diagram of the overall structure and calculation of a 2D LSTM.
Figure 3:
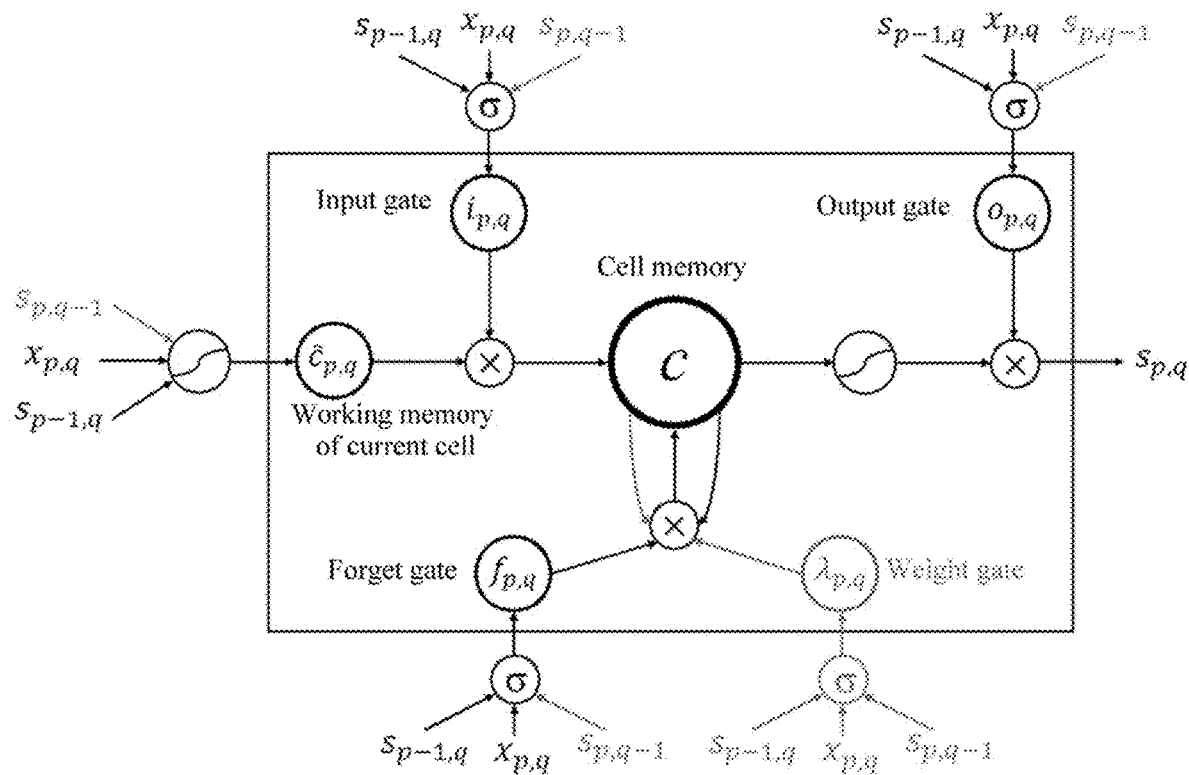
FIG. 3 is a schematic diagram of the internal structure and calculation of a 2D LSTM cell.

2. a) The structure of 2dseq 2seq model is as follows: the 2D Seq2Seq model consists of an Encoder and a Decoder. The encoder consists of a two-layer 2D LSTM (long short-term memory) network and a fully connected network in cascade connection; the decoder consists of a fully connected network and a two-layer 2D LSTM network in cascade connection; the two-layer 2D LSTM refers to two cascaded 2D LSTM networks, in which the hidden state information dimensions of the two cascaded 2D LSTM networks are equal; the overall and internal structure and calculation schematic diagram of the 2D LSTM network are shown in FIGS. 2 and 3. As shown in FIG. 2, 2D LSTM is a network structure in which 2D LSTM cell shared by parameters are expanded and iteratively calculated in two dimensions. FIG. 3 shows the internal structure and calculation flow of THE 2D LSTM cell, in which the combinations of p, q, p−1 and q−1 in the subscripts of each variable indicates the cell to which the variable belongs, s is the state information, and is further the output information of the cell, x is the input information, i is an input gate, i is an output gate, f is a forget gate, f is a weight gate, c is cell memory, $\tilde{c}$ is working memory, σ(□) is a sigmoid function, g(□) is an activation function tanh (•). The calculation flow inside the LSTM cell in FIG. 3 is as follows:

$$i_{p,q} = \sigma(W_i x_{p,q} + U_i s_{p-1,q} + V_i s_{p,q-1} + b_i)$$

$$f_{p,q} = \sigma(W_f x_{p,q} + U_f s_{p-1,q} + V_f s_{p,q-1} + b_f)$$

$$o_{p,q} = \sigma(W_o x_{p,q} + U_o s_{p-1,q} + V_o s_{p,q-1} + b_o)$$

$$\lambda_{p,q} = \sigma(W_\lambda x_{p,q} + U_\lambda s_{p-1,q} + V_\lambda s_{p,q-1} + b_\lambda)$$

$$\tilde{c}_{p,q} = g(W_{\tilde{c}} x_{p,q} + U_{\tilde{c}} s_{p-1,q} + V_{\tilde{c}} s_{p,q-1} + b_{\tilde{c}})$$

$$c_{p,q} = f_{p,q} \cdot [\lambda_{p,q} \cdot c_{p-1,q} + (1 - \lambda_{p,q}) \cdot c_{p,q-1}] + i_{p,q} \cdot \tilde{c}_{p,q}$$

$$s_{p,q} = o_{p,q} \cdot g(c_{p,q})$$

where ○ represents a Hadamard product, and W, U, V, b represent parameters of the neural network.

W represents a weight matrix of the input part, U represents a weight matrix of the first dimension state information, V represents a weight matrix of the second dimension state information, b represents bias; the subscripts i, f, o, $\lambda$, $\tilde{c}$ represent the gates or memories to which the parameters W, U, V, b belong.

Figure 4:
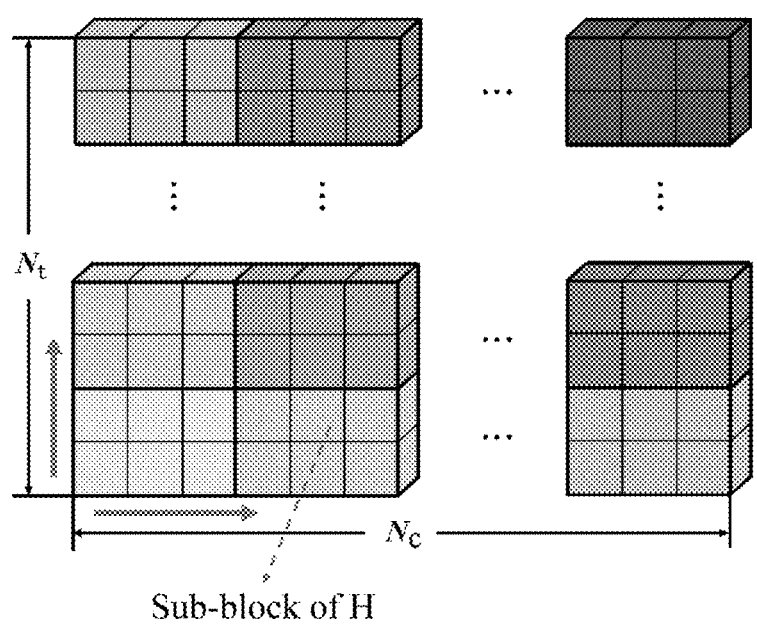
FIG. 4 is a sub-block division mode diagram of MIMO-OFDM CSI.

2.b) For the $N_t \times N_c$-dimensional MIMO-OFDM CSI ($N_t$ is the number of base station antennas and N is the number of subcarriers), it is divided into two-dimensional sequences consisting of several sub-blocks, as shown in FIG. 4. When the whole CSI matrix is input to the 2D LSTM, each sub-block is input to the corresponding cell of the 2D LSTM. Similarly, when the CSI matrix is reconstructed by using the two-dimensional LSTM output, each cell gets a reconstructed sub-block, and these sub-blocks are spliced according to the order of the corresponding cells to form a reconstructed CSI matrix. The calculation process of the 2D Seq2Seq model is described in 2.c and 2.d below. Here, the size of the sub-block is set to 1 antenna×32 carriers.

2.c) In the Encoder, firstly, the MIMO-OFDM CSI is divided into several sub-blocks as in step 2.b). Then each sub-block is input into the corresponding cell in the two-layer 2D LSTM of the Encoder, where the output size of the cell in the two-layer 2D LSTM is the same as the dimension of the sub-block. After two-layer of 2D LSTM, the outputs of all cells are spliced into a matrix with a size of $N_t \times N_c$ according to the order of corresponding cells, and the matrix is stretched into a vector with a length of $N_t \times N_c$. Then, the vector with the length of $N_t \times N_c$ is input into the fully connected layer to obtain a compressed vector $h_{com}$. In this way, the Encoder completes the task of compressing the original MIMO-OFDM CSI into a vector with a lower dimension.

2.d) In the Decoder, firstly, the compressed vector $h_{com}$ compressed by the Encoder is input into the fully connected layer in the Decoder to obtain a vector with a length of $N_t \times N_c$, and then the vector with the length of $N_t \times N_c$ is reconstructed into a matrix with a dimension size of $N_t \times N_c$. Then, the matrix is divided into several sub-blocks according to the same division method as the sub-blocks in step 2.c), and input them into the corresponding cells in the two-layer 2D LSTM of Decoder in turn, and the outputs of all cells are spliced into a matrix with a size of $N_t \times N_c$ according to the order of the corresponding cells, so as to obtain the reconstructed MIMO-OFDM CSI. In this way, the Decoder completes the task of reconstructing MIMO-OFDM CSI from compressed vector.

3) The base station uses the collected training data to train the neural network in step 2), and continuously trains the parameters of the 2D Seq2Seq neural network through a back propagation method until convergence;

3.a) The loss function (Loss) of the neural network is defined as follows:

$$\text{Loss } (\Theta) = \frac{1}{N}\sum_{n=1}^{N}\|H_n - \hat{H}_n\|_2^2,$$

where $\Theta$ represents s the parameter of the neural network, N represents the number of training data, $H_n$ represents the $n^{th}$ original training data, and $\hat{H}_n$ represents an output obtained after inputting $H_n$ into the 2D Seq2Seq network.

3.b) The training of the neural network is based on an Adaptive Moment Estimation (Adam) optimizer. The learning rate is set to 0.001, 800 cycles of training are carried out, and after the 500th training cycle, the learning rate is reduced to ⅕ of the previous one.

4) The base station sends the Encoder of the 2D Seq2Seq neural network trained in step 3) to the client.

5) The user compresses the downlink CSI using the Encoder issued in step 4), and feeds back the compressed information to the base station.

6) The base station reconstructs the compressed information fed back by the user in step 5) by using the Decoder of the 2D Seq2Seq neural network trained in step 3) to obtain a complete downlink CSI.

Figure 5:
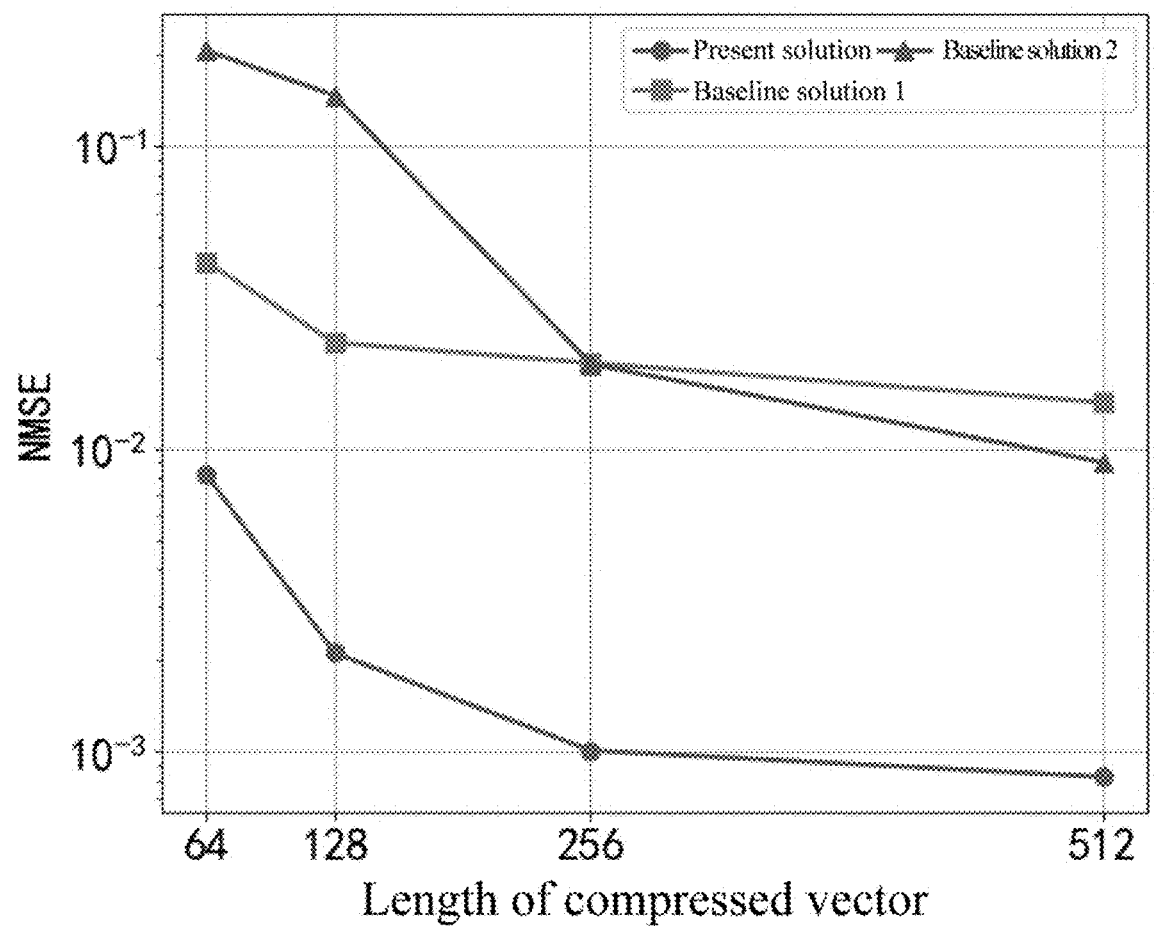
FIG. 5 is a comparison diagram between the CSI compression and feedback method based on 2D Seq2Seq and other common methods.

It can be seen from the computer simulation that as shown in FIG. 5, the CSI feedback solution based on a 2D Seq2Seq neural network proposed by the present disclosure is comparable with the traditional compression method based on a convolutional neural network with the same compression length; the baseline solution 1 CsiNet and the baseline solution 2 AE_CNN have obvious accuracy improvement. The reason for these advantages is that the 2D Seq2Seq structure used in this solution is more suitable for the physical structure of MIMO-OFDM CSI. Therefore, the CSI feedback solution based on a 2D Seq2Seq neural network provided by the present disclosure provides an efficient CSI feedback solution for large-scale MIMO communication systems.

The above is only the preferred embodiment of the present disclosure, but the protection scope of the present disclosure is not limited thereto. Any change or substitution that can be easily conceived by a person skilled in the art within the technical scope disclosed in the present disclosure shall be included in the protection scope of the present disclosure. Therefore, the scope of protection of the present disclosure shall be defined based on the scope of protection of the claims.

What is claimed is:

1. A Channel State Information (CSI) compression and feedback method based on deep learning, the CSI compression and feedback method is applied to a multiple-input, multiple-output orthogonal frequency-division multiplexing (MIMO-OFDM) system, comprising:
   step S1, establishing and training a two-dimensional sequence-to-sequence structure neural network;
   sub-step S1.1, collecting, by a base station, 40,000 historical CSI data from a user terminal with a single receiving antenna by configuring the MIMO-OFDM system with 32 transmitting antennas and 256 subcarriers as training data of the two-dimensional sequence-to-sequence structure neural network;
   sub-step S1.2, building, by the base station, the two-dimensional sequence-to-sequence structure neural network, and randomly initializing parameters of the two-dimensional sequence-to-sequence structure neural network, wherein the two-dimensional sequence-to-sequence structure neural network comprises:
   an encoder comprising two cascaded 2D long short-term memory (LSTM) layers and one fully connected layer, wherein each layer of the two cascaded 2D LSTM layers has 128 hidden units, each cell of the 2D LSTM layers shares parameters in two dimensions, a CSI matrix is sub-blocked to obtain 1×32 sub-blocks, and each sub-block corresponds to a channel response of an antenna port on 32 consecutive subcarriers; and
   a decoder comprising one fully connected layer and two cascaded 2D LSTM layers, wherein an output dimension of the fully connected layer of the decoder matches an input dimension of the fully connected layer at an end of the encoder; and the 2D LSTM layer of the decoder reconstructs 1×32 sub-blocks through parameter-sharing units; and sub-step S1.3, based on an adaptive momentum estimation (Adam) optimizer, training the two-dimensional sequence-to-sequence structure neural network in the sub-step S1.2, and continuously training the parameters of the two-dimensional sequence-to-sequence structure neural network by a gradient descent method until convergence, wherein a learning rate is set to 0.001, and the training is repeated for 800 cycles, and the learning rate is decayed to ⅕ of a previous one every 100 cycles after a 500th training cycle;

step S2, distributing, by the base station, the encoder of the two-dimensional sequence-to-sequence structure neural network trained in the sub-step S1.3 to a client;

step S3, compressing, by the client, downlink CSI by using the encoder distributed in the step S2, and feeding the compressed downlink CSI back to the base station; and step S4, reconstructing, by the base station, the compressed downlink CSI fed back by the client in the step S3 by using the decoder of the two-dimensional sequence-to-sequence structure neural network trained in the sub-step S1.3 to obtain complete downlink CSI, inputting the reconstructed complete downlink CSI into a downlink precoding module to generate beamforming parameters, and performing beamforming, subcarrier allocation and power control on a downlink signal based on the beamforming parameters, to optimize a communication performance of the MIMO-OFDM system.

2. The CSI compression and feedback method based on deep learning according to claim 1, wherein the two-dimensional recurrent neural network uses a two-dimensional long short-term memory network.

3. The CSI compression and feedback method based on deep learning according to claim 2, wherein a CSI division process in the sub-step S1.2 comprises:

dividing the CSI into two-dimensional sequences comprising several sub-blocks for $N_t \times N_c$-dimensional multi input MIMO-OFDM CSI, where $N_t$ represents a number of base station antennas and $N_c$ represents a number of subcarriers.

4. The CSI compression and feedback method based on deep learning according to claim 3, wherein a working process of the encoder comprises:

inputting each sub-block obtained after dividing the MIMO-OFDM CSI into a first cell corresponding to the two-dimensional long short-term memory network of the encoder, wherein an output size of the first cell in the two-dimensional long short-term memory network is same as a dimension of the first sub-blocks; concatenating the outputs of all the first cells into a first matrix with a dimension size of $N_t \times N_c$ according to the order of the first cells, and stretching the first matrix into a first vector with a length of $N_t \times N_c$; and inputting the first vector with the length of $N_t \times N_c$ into a fully connected layer to obtain a compressed vector $h_{com}$.

5. The CSI compression and feedback method based on deep learning according to claim 3, wherein a working process of the decoder comprises:

inputting the compressed vector $h_{com}$ compressed by the encoder into a fully connected layer in the decoder to obtain a second vector with a length of $N_t \times N_c$, reconstructing the second vector with the length of $N_t \times N_c$ into a second matrix with a dimension size of $N_t \times N_c$, dividing the second matrix into the second sub-blocks in a same way as the CSI division process, sequentially inputting the second sub-blocks into the second cells corresponding to the two-dimensional long short-term memory network of the decoder, and concatenating the outputs of all the second cells into the second matrix with the dimension size of $N_t \times N_c$ according to the order of the second cells to obtain reconstructed MIMO-OFDM CSI.

6. The CSI compression and feedback method based on deep learning according to claim 1, wherein in a training method for the two-dimensional sequence-to-sequence structure neural network in the sub-step S1.3, a loss function Loss ($\Theta$) of the two-dimensional sequence-to-sequence structure neural network is defined as follows:

$$\text{Loss } (\Theta) = \frac{1}{N} \sum_{n=1}^{N} \|H_n - \hat{H}_n\|_2^2,$$

where $\Theta$ represents a parameter set of the two-dimensional sequence-to-sequence structure neural network, N represents a number of the training data, $H_n$ represents a $n^{th}$ original training data, and $\hat{H}_n$ represents an output obtained by inputting $H_n$ into the two-dimensional sequence-to-sequence structure neural network.

7. The CSI compression and feedback method based on deep learning according to claim 1, wherein the two-dimensional sequence-to-sequence structure neural network in the sub-step S1.3 is trained based on a optimizer based on gradient descent, comprising: performing, by the optimizer, gradient descent by deriving the loss function and back propagating the gradient to generate a gradient corresponding to the parameters of the two-dimensional sequence-to-sequence structure neural network, to continuously optimize the parameters of the two-dimensional sequence-to-sequence structure neural network until the convergence.

* * * * *